United States Patent [19]

Fukushima

[11] Patent Number: 5,731,871
[45] Date of Patent: Mar. 24, 1998

[54] LIGHT QUANTITY MEASURING DEVICE THAT CAN ACCURATELY MEASURE QUANTITY REGARDLESS OF POLARIZATION OF MEASURED LIGHT

[75] Inventor: Nobuhiro Fukushima, Kawasaki, Japan

[73] Assignee: Fujitsu Limited, Kawasaki, Japan

[21] Appl. No.: 714,992

[22] Filed: Sep. 17, 1996

[30] Foreign Application Priority Data

Dec. 12, 1995 [JP] Japan ................... 7-322750

[51] Int. Cl.$^6$ ................... G01J 1/42; G01J 1/44
[52] U.S. Cl. ................... 356/222; 356/226
[58] Field of Search ................... 356/213, 222, 356/226, 365; 250/214 A, 214 R, 214 AG

[56] References Cited

FOREIGN PATENT DOCUMENTS

| | | |
|---|---|---|
| 1-302542 | 5/1988 | Japan . |
| 6-96489 | 8/1994 | Japan . |

*Primary Examiner*—Frank G. Font
*Assistant Examiner*—Amanda Merlino
*Attorney, Agent, or Firm*—Staas & Halsey

[57] ABSTRACT

Disclosed is a light quantity measurement device that can accurately monitor light intensity regardless of the polarized condition of incident light. A light quantity measuring device comprises: a birefringent optical device; transmission means for passing incident light from a light source; and a light-receiving device for receiving an ordinary light beam and an extraordinary light beam from the transmission means. The light-receiving device has at the least two electrically separated light-receiving areas from which currents produced by received light are independently output, and includes first and second variable gain amplification means for amplifying currents, which are produced by received light, from the two electrically separated light-receiving areas, and an addition circuit for adding together those currents that are amplified by the first and the second amplification means.

12 Claims, 3 Drawing Sheets

LIGHT QUANTITY MEASURING DEVICE THAT CAN ACCURATELY MEASURE QUANTITY REGARDLESS OF POLARIZATION OF MEASURED LIGHT

BACKGROUND OF THE INVENTION

1. Field of the Invention

The present invention relates to a light quantity measurement device, and in particular to a light quantity measurement device that can accurately monitor light quantity regardless of the polarized condition of the light that is to be measured.

2. Related Arts

A light quantity measuring device is employed to measure the intensity of light that is propagated across an optical fiber for optical communication, for example, and to adjust the light intensity in consonance with the measured value.

The general structure of a light quantity measuring device that is used for optical communication is shown in FIG. 5. A light signal that is propagated across an optical fiber 1 is branched by a opticalcoupler 2 that is located along the route of the propagation path. The branched light signal is received by a light-receiving device 3, such as a photodiode, and is converted into an electric signal. The quantity of light in the light signal can be measured by monitoring the obtained electric signal.

The photocoupler 2 is constituted by an optical film, and the light components that are branched at this opticalcoupler 2 are received by the photodiode 3.

Although theoretically the branching ratio for an ideal optical film would not be affected by polarized light, it is difficult for an actual optical film in the above system to prevent its branching ratio from fluctuating due to polarized light. The photodiode also tends to be dependent on polarized light because of the anisotropy that is incorporated during its manufacture, though the degree of fluctuation is smaller than that of an optical film.

SUMMARY OF THE INVENTION

As is described above, a property of the light that is to be measured is that when the polarized condition of the light is altered, the branching ratio for the light is varied, even though the light intensity is not changed. The sensitivity of a light-receiving device is dependent on polarized light. Because of these factors, a conventional light quantity measuring device, depending on the polarized condition of the light, does not always accurately measure light intensity.

To obtain accurate measurements, an expensive device must be designed that has an especially low polarized light dependency, or else delicate adjustments are required.

It is therefore one object of the present invention to provide a light quantity measuring device by which the conventional problems are resolved.

To achieve the above object of the present invention, the basic structure of a light quantity measuring device includes: branching means for branching incident light emitted by a light source; a birefringent optical device for receiving light that is branched by said branching means; a light-receiving device having two electrically separated light-receiving areas for receiving ordinary and extraordinary light beams from said birefringent optical device, for converting said received ordinary and extraordinary light beams into electric current signals, and for outputting the converted electric current signals independently from the two electrically separated light-receiving areas; first and second amplification means, gains of which can be variablly controlled, for amplifying said converted electric signals outputted independently from the two electrically separated light-receiving areas; and an addition circuit for adding together the currents that are amplified by said first and said second amplification means and for producing an output of addition, the gains of the first and second amplification means being controlled so that the output of addition from the addition circuit becomes constant.

With this feature of the present invention, the principle of the light quantity measuring device differs from the light-receiving mechanism of a conventional light quantity measuring device. The light-receiving area is divided into two areas, with output signals being processed and then synthesized, so that effects that are due to a dependency on polarized light can be removed when the light is branched.

DETAILED DESCRIPTION OF THE PREFERRED EMBODIMENT

Figure 1:
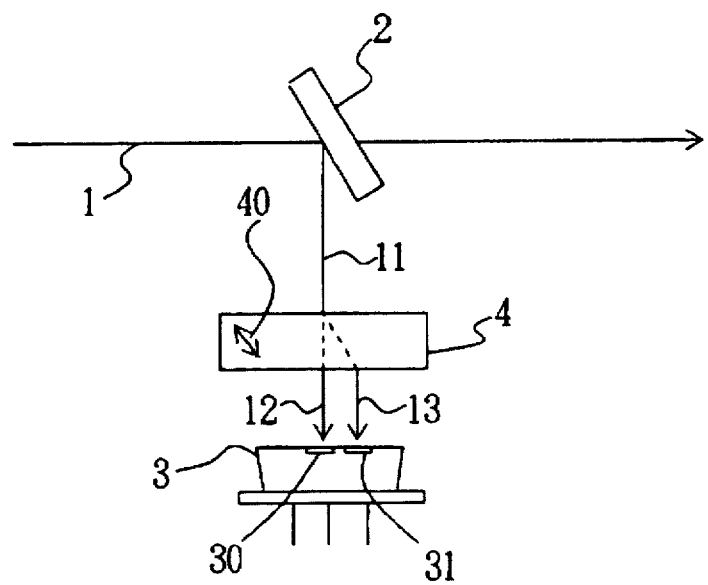
FIG. 1 is a diagram illustrating one embodiment of the present invention.

The preferred embodiment of the present invention will now be described while referring to the accompanying drawings. The same reference numerals are used throughout to denote corresponding or identical components.

FIG. 1 is a diagram illustrating one embodiment of the present invention. A photocoupler 2 composed of multilayered dielectric film transmits and reflects a light signal that is propagated across and emitted by an optical fiber 1. The light reflected by the photocoupler 2 enters an optical device 4 that has a birefringent property.

The photocoupler 2 is for example, a diffraction grating, and a zero-order light output from the diffraction grating is employed as a main signal and a primary light output is employed as a branched light.

In this embodiment, a rutile ($TiO_2$) plate is used as the optical device 4. Further, an optic axis 40 of the rutile plate 4 is inclined at an angle of 45 degrees relative to a light path 11. Light of the primary light output from the photocoupler 2, and enters to the rutile plate 4. The rutile plate 4 then divides the inputted light into an ordinary light beam 12 and an extraordinary light beam 13 by the birefringent property of the plate 4.

Supposing that the rutile plate 4 is about 1 mm thick, the ordinary light beam 12 and the extraordinary light beam 13 that are polarized are separated by a distance of about 0.1 mm. This is smaller than the diameter of a beam of a common optical signal. Although the beam is divided into the ordinary light beam 12 and the extraordinary light beam 13, due to the polarization the beams are not yet completely separate. For complete separation, a thicker rutile plate is required. The present invention, however, does not need to use such an expensive thick plate to attain full separation.

The beam, which is partially separated, so enters the photodiode 3, which is a light-receiving device having a pair of electrically separated light-receiving areas 30 and 31, that the direction in which the beam is separated matches the direction in which the light-receiving device is divided. The photodiode, which is required for the structure of the invention and wherein electrically separated areas are integrally formed on a single semi-conductor substrate, is produced industrially for use in position detection applications, and is commercially available.

Figure 2:
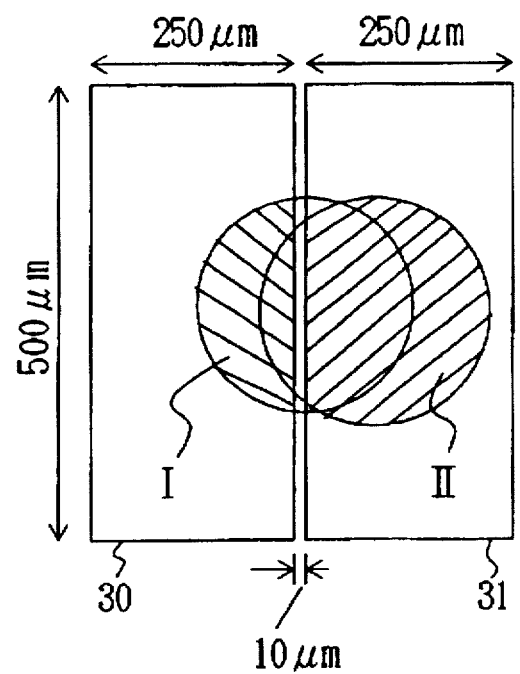
FIG. 2 is a diagram for explaining a light-receiving area of a light-receiving device.

Now, to discuss the light-receiving areas 30 and 31 of the photodiode 3 shown in FIG. 2, the ordinary light I and the extraordinary light II, which are the output of the rutile plate 4, are projected onto the light-receiving areas 30 and 31.

In the light-receiving area 30, the receiving area size for the ordinary light I is larger, and it provides a high conversion efficiency relative to the ordinary light I, which is the output of the rutile plate 4. Contrarily, the receiving area size for the extraordinary light II is larger in the light-receiving area 31, and it also provides a high conversion efficiency relative to the extraordinary light II, the output of the rutile plate 4.

In other words, both areas are so designed that they have a polarized light dependency and they are opposite from each other. However, the sum of the two outputs from the light-receiving areas 30 and 31 of the photodiode 3 should be equal to the output of a single, undivided photodiode.

The polarized light dependency that is due to the multilayered dielectric film of the photocoupler 2 changes the ratio for the outputs of the light-receiving areas 30 and 31 of the photodiode 3.

The effect of the polarized light dependency provided by the rutile plate 4 is added to the effect of the polarized dependency that is due to the multilayered dielectric film. Since the effect of the polarized light dependency acquired from the rutile plate 4 is adjusted in consonance with the positioning of the elements, the effect can be adjusted by altering the ratio for the outputs of the light-receiving areas 30 and 31.

Figure 3:
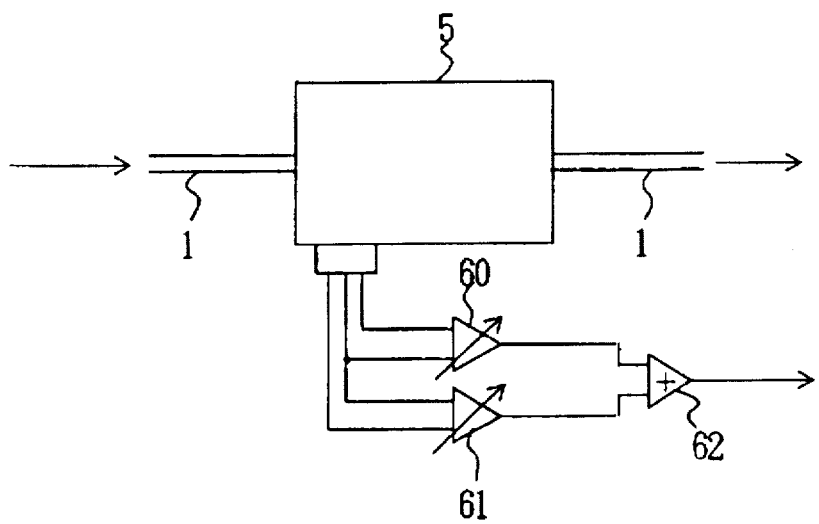
FIG. 3 is a diagram illustrating gain control for an amplifier.

Therefore, if the ratio of the output of the light-receiving area 30 to the output of the light-receiving area 31 is adjusted in consonance with the polarized light dependency and is added to the effect due to the multilayered dielectric film, the polarized dependency can be removed. This removal may be performed electrically. In FIG. 3 is shown the structure for adjusting the ratio of the output of the light-receiving area 30 to the output of the light-receiving area 31.

In FIG. 3, reference numeral 1 denotes an optical fiber 1, and reference numeral 5 denotes the unit which includes the photocoupler 2, the rutile plate 4, and the light-receiving device 3. The outputs of the light-receiving areas 30 and 31 of the light-receiving device 3 are transmitted respectively to variable gain amplifiers 60 and 61, whose gains may be adjusted. The outputs of the amplifiers 60 and 61 are added together by an addition amplifier 62.

The output of the addition amplifier 62 is compared with a predetermined value (not shown), and the gains of the amplifiers 60 and 61 are adjusted in consonance with the polarized light dependency, so as to obtain a specified difference. This adjustment may be performed by adjusting circuit configuration after the production of a device that has a branching function is produced, or by software after the measuring device is completed.

An explanation has been given for a case wherein only a photodiode is used as the light-receiving device 3. A phototube that has electrically separated light-receiving electrodes may also be used.

Figure 4:
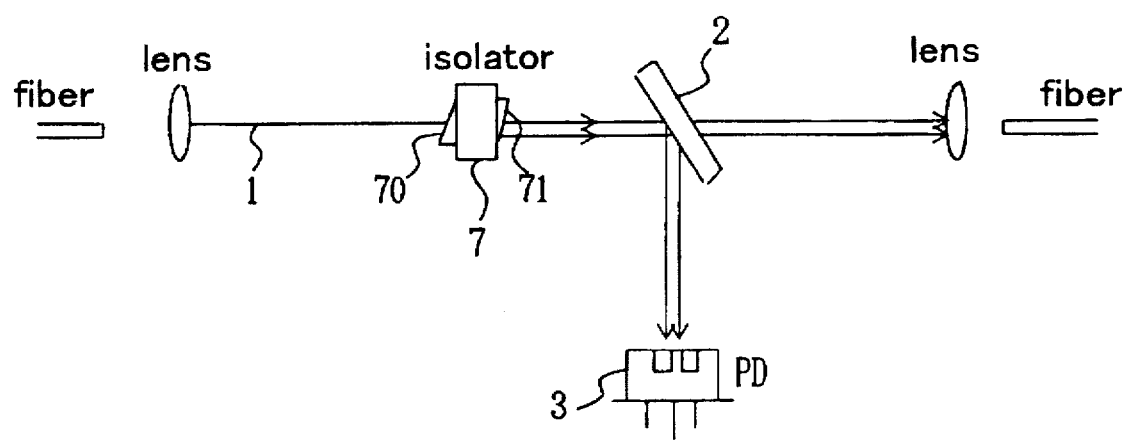
FIG. 4 is a diagram for explaining an example wherein an isolator is employed instead of a birefringent crystal board.
Figure 5:
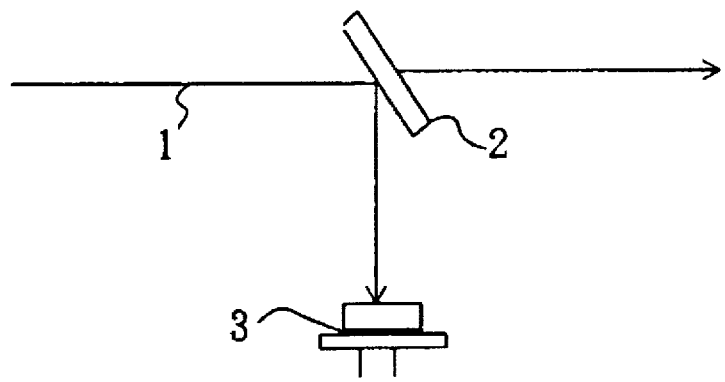
FIG. 5 is a diagram for explaining prior art.

Further, so long as a beam is positionally separated by using polarized light, a birefringent device other than the rutile plate 4 can be used. Especially, the present invention can be applied to a beam that is passed through and separated by an optical isolator 7, which employs a wedge shaped plate, that is located as a front stage for the photocoupler 2, as is shown in FIG. 4.

Further, an explanation has been given wherein the output of the amplifier 62 is compared with a predetermined value (not shown), and the gains of the variable amplifiers 60 and 61 are so adjusted, in consonance with the polarized light dependency, as to maintain a constant difference.

Specifically, a linear polarized light, for which the plane of polarization is rotating, enters the rutile plate 4, and a change in a current at each of the separated light-receiving areas of the light-receiving device is measured. The rotation of the plane of polarization and synchronous elements are detected, and the gains of the amplifiers 60 and 61 in FIG. 3 are so adjusted that between the light-receiving areas the amplitudes of the synchronous elements become equal.

As another specific example, means is employed for controlling polarized light of an incident light with reproduction, so that the light sweeps an arbitrary point on a Poincare sphere. A current change in each of the two separated light-receiving areas of the light-receiving device is measured, and the control speed and synchronous elements are detected. Then, the gains of the first and the second amplifiers 60 and 61 are so adjusted that they equal the amplitudes of the synchronous elements between the two light-receiving areas.

As is described according to the embodiment, the present invention can provide light reception that has less polarized light dependency. Although during the manufacture of light quantity measuring devices, the polarized light dependency of a branching film is usually varied, identification and adjustment of a difference in the dependency is not required when electric compensation for the difference is employed.

What is claimed is:

1. A light quantity measuring device comprising:

branching means for branching incident light emitted by a light source;

a birefringent optical device for receiving light that is branched by said branching means;

a light-receiving device having two electrically separated light-receiving areas for receiving ordinary and extraordinary light beams from said birefringent optical device, for converting said received ordinary and extraordinary light beams into electric current signals, and for outputting the converted electric current signals independently from the two electrically separated light-receiving areas;

first and second amplification means, gains of which can be variablly controlled, for amplifying said converted electric signals outputted independently from the two electrically separated light-receiving areas; and an addition circuit for adding together the currents that are amplified by said first and said second amplification means and for producing an output of addition, the gains of the first and second amplification means being controlled so that the output of addition from the addition circuit becomes constant.

2. The light quantity measuring device according to claim 1, wherein said branching means for branching said incident light from said light source is a multilayered dielectric film that is so positioned that said multi-layered dielectric film is inclined relative to said incident light.

3. The light quantity measuring device according to claim 1, wherein said branching means for branching said incident light from said light source is a diffraction grating, and wherein zero-order light output by said diffraction grating is employed as a main signal and a primary light output is employed as a branched light.

4. The light quantity measuring device according to claim 1, 2 or 3, wherein said light-receiving device includes at least two diodes that are electrically separated from each other and that are integrally formed on a single semiconductor substrate.

5. The light quantity measuring device according to claim 1, 2 or 3, wherein said light-receiving device is a phototube that includes electrically separated light-receiving electrodes.

6. The light quantity measuring device according to claim 1, wherein said birefringent optical device is a flat plate consisting of a birefringent crystal, and wherein an optic axis of said flat plate is set at an angle of 45 degrees relative to a light path.

7. The light quantity measuring device according to claim 1, wherein said birefringent optical device is a wedge shaped plate consisting of birefringent crystals, and wherein an optic axis of said wedge shaped plate is set perpendicular to a light path.

8. A light quantity measuring device comprising:

a birefringent optical device including a pair of wedge shaped plates of birefringent crystals, which are located opposite to each other so that the pair of wedge shaped plates are oriented in opposite directions, for receiving a signal light from a light source, branching means for branching a light output from said birefringent optical device;

a light-receiving device having two electrically separated light-receiving areas for receiving ordinary and extraordinary light beams from said branching means, for converting said received ordinary and extraordinary light beams into electric current signals, and for outputting the converted electric current signals, independently from the two electrically separated light-receiving areas;

first and second amplification means, gains of which can be variably controlled, for amplifying said converted electric signals outputted independently from the two electrically separated light-receiving areas; and an addition circuit for adding together the currents that are amplified by said first and said second amplification means and for producing an output of addition, the gains of the first and second amplification means being controlled so that the output of addition from the addition circuit becomes constant.

9. A light quantity measuring device comprising:

an isolator including a pair of wedge shaped plates of birefringent crystals, which are located opposite to each other so that the pair of wedge shaped plates are oriented in opposite directions, for receiving a signal light from a light source;

branching means for branching a light output from said isolator;

a light-receiving device having two electrically separated light-receiving areas for receiving ordinary and extraordinary light beams from said branching means, for converting said received ordinary and extraordinary light beams into electric current signals, and for outputting the converted electric current signals independently from the two electrically separated light-receiving areas;

first and second amplification means, gains of which can be variably controlled, for amplifying said converted electric signals outputted independently from the two electrically separated light-receiving areas; and an addition circuit for adding together the currents that are amplified by said first and said second amplification means and for producing an output of addition, the gains of the first and second amplification means being controlled so that the output of addition from the addition circuit becomes constant.

10. The light quantity measuring device according to claim 1, wherein said light that enters is employed as linearly polarized light having a rotating plane of polarization, and wherein a current change for each of said two separated light-receiving areas of said light-receiving device is measured, rotation of said plane of polarization and synchronous elements are detected, and said gains of said first and said second amplification means are so adjusted that amplitudes of said synchronous elements between said two light-receiving areas are equal.

11. The light quantity measuring device according to claim 1, further comprising means for controlling polarized light of an incident light with reproduction, so that said polarized light sweeps an arbitrary point on a Poincare sphere, wherein a current change for each of said two separated light-receiving areas of said light-receiving device is measured, a control speed and synchronous elements are detected, and said gains of said first and said second amplifiers are so adjusted that said amplitudes of said synchronous elements between said two light-receiving areas are equal.

12. A light quantity measuring device, comprising:

a birefringent member to divide an input light beam into an extraordinary and ordinary output beam;

a light receiving device to receive the ordinary and extraordinary output beams;

first and second amplification devices each having a gain that can be variably controlled and producing output currents depending on the gain;

an adder to add the output currents which are independently varied to produce a constant output from the adder.

* * * * *